United States Patent [19]

Mochinaga

[11] Patent Number: 5,581,549
[45] Date of Patent: Dec. 3, 1996

[54] PROCESSOR RESETTING METHOD AND APPARATUS

[75] Inventor: Tatsuo Mochinaga, Yokohama, Japan

[73] Assignee: Hitachi, Ltd., Tokyo, Japan

[21] Appl. No.: 86,888

[22] Filed: Jul. 7, 1993

[30] Foreign Application Priority Data

Jul. 9, 1992 [JP] Japan ............................. 4-182390

[51] Int. Cl.$^6$ ............................................ H04L 12/56
[52] U.S. Cl. ............................................ 370/395
[58] Field of Search ............................. 370/60, 94.1, 13,
370/17, 17, 110.1, 100.1, 16, 16.1; 371/20.1,
25.1, 15.1, 20.4, 37.1, 10.1, 37.3; 340/827,
825.01; 379/221; 395/180, 181, 182.14,
182.21, 183.01; 375/213

[56] References Cited

U.S. PATENT DOCUMENTS

| | | | |
|---|---|---|---|
| 5,163,057 | 11/1992 | Grupp | 370/13 |
| 5,168,497 | 12/1992 | Ozaki et al. | 370/94.3 |
| 5,251,204 | 10/1993 | Izawa et al. | 370/13 |
| 5,271,000 | 12/1993 | Engbersen et al. | 370/13 |
| 5,339,314 | 8/1994 | Tanaka et al. | 370/85.15 |
| 5,339,317 | 8/1994 | Tanaka et al. | 370/85.15 |
| 5,392,286 | 2/1995 | Tanaka et al. | 370/85.15 |

FOREIGN PATENT DOCUMENTS 1-206754  8/1989  Japan.

*Primary Examiner*—Douglas W. Olms
*Assistant Examiner*—Dang Ton
*Attorney, Agent, or Firm*—Antonelli, Terry, Stout & Kraus

[57] ABSTRACT

In a communication network including a plurality of nodes, when it is desired for a processor A of one of the nodes to reset another processor B within the same node or within another of the nodes, the processor A side generates a reset cell and transmits it to the party processor B side through a channel. The party processor B side confirms that the received cell is a reset cell, accepts the cell, and outputs a reset signal to the processor B to reset the processor B.

13 Claims, 7 Drawing Sheets

PROCESSOR RESETTING METHOD AND APPARATUS

BACKGROUND OF THE INVENTION

1. Field of the Invention

The present invention relates to a processor resetting method, more particularly to a processor resetting method and apparatus for resetting a processor within such an Asynchronous Transfer Mode (which will be referred to merely as ATM, hereinafter) node as an ATM switching system, a multiplexer, or a terminal through a channel.

2. Description of the Related Art

A Broadband aspects of Integrated Services Digital Network (which will be referred to merely as B-ISDN, hereinafter) comprises ATM nodes such as ATM switching systems, multiplexers, or terminals and lines for interconnection between the ATM nodes.

Each of the ATM nodes generally includes at least one processor which communicates with another processor within the same node or a processor within another node. In such inter-processor communication, processor resetting can be realized when the sender processor transmits a resetting instruction to the receiver processor and the receiver processor executes the received instruction.

This type of prior art is known, for example, as a technique standardized by CCITT (Comite Consultatif International des Telegraphique et Telephonique, International Telegraph and Telephone Consultative Committee) X.25. When it is desired to reset one terminal belonging to an X.25 network from another terminal therein, the sender terminal transmits a packet indicative of reset instructions to the receiver terminal. The receiver terminal identifies the received packet and executes its reset processing. The format of the reset instruction packet is previously standardized.

The above prior art, however, has had a problem that, when it is desired to reset one of the processors within one terminal, it is necessary for the processor to identify a reset instruction frame, so that, when the processor is in a runaway condition or the like, the processor cannot accept the reset instruction and thus cannot be reset.

SUMMARY OF THE INVENTION

It is an object of the present invention to provide a processor resetting method and apparatus which can reset a processor regardless of the state of the processor.

In accordance with an aspect of the present invention, the above object is attained by providing cell assembly means for transmitting a specific pattern of reset instructions from a sender side to a receiver side, means for identifying the reset instructions received at the receiver side, and means for resetting the receiver processor.

In the present invention, since the reset signal is transmitted a reset signal in a cell form, the reset signal can be transmitted through the same channel as for an inter-processor communication signal. Further, since a circuit other than the processor can identify the reset cell to reset the processor in the receiver side, the processor resetting can be carried out regardless of the state of the processor.

DESCRIPTION OF THE PREFERRED EMBODIMENTS

A proceesor resetting system in accordance with the present invention will be explained with reference to the accompanying drawings.

Explanation will be made, as an embodiment, when an ATM node is an ATM switching system, the ATM switching system includes a plurality of processors and communication is to be carried out between the processors.

In a B-ISDN, information is transmitted on a cell unit basis. Cells are classified into a user cell for transmitting information of terminal users belonging to the B-ISDN, and communication/reset cells for transmitting information for controlling of the network or ATM nodes in the ATM nodes or between the ATM nodes.

Figure 1:
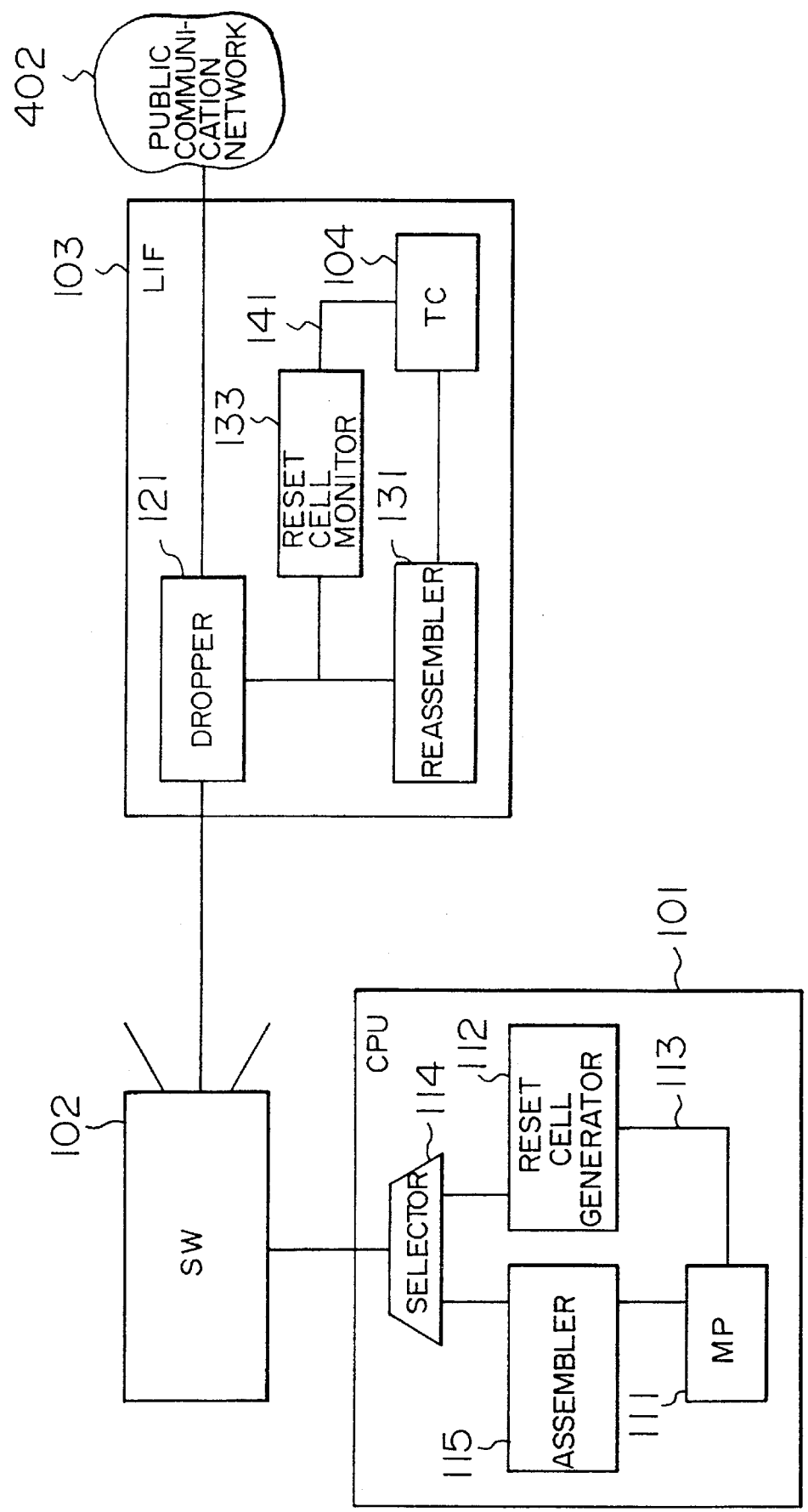
FIG. 1 is a block diagram of an arrangement of an ATM switching system in accordance with an embodiment of the present invention.
Figure 2:
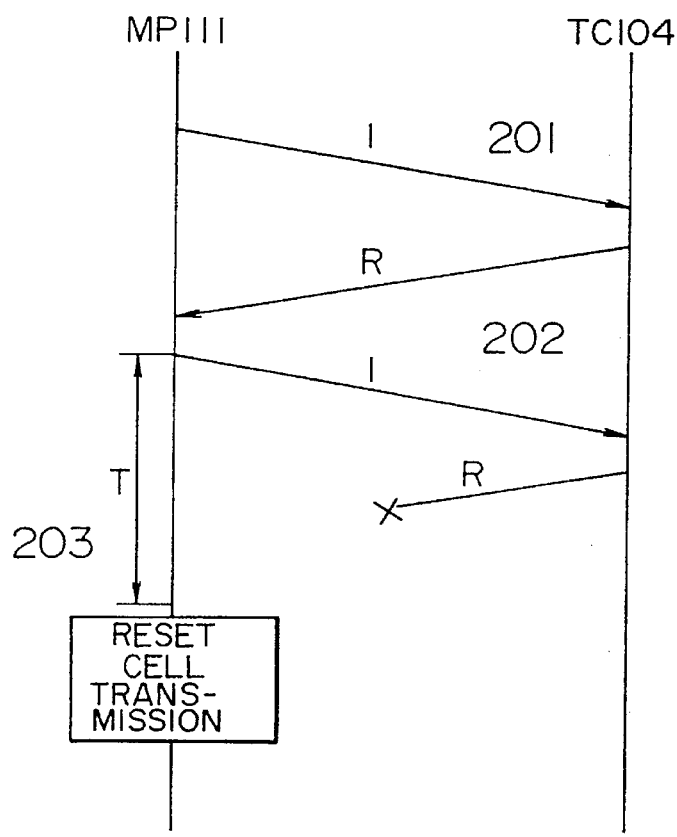
FIG. 2 is a diagram for explaining a communication sequence of two processors within the ATM switching system of FIG. 1.
Figure 3:
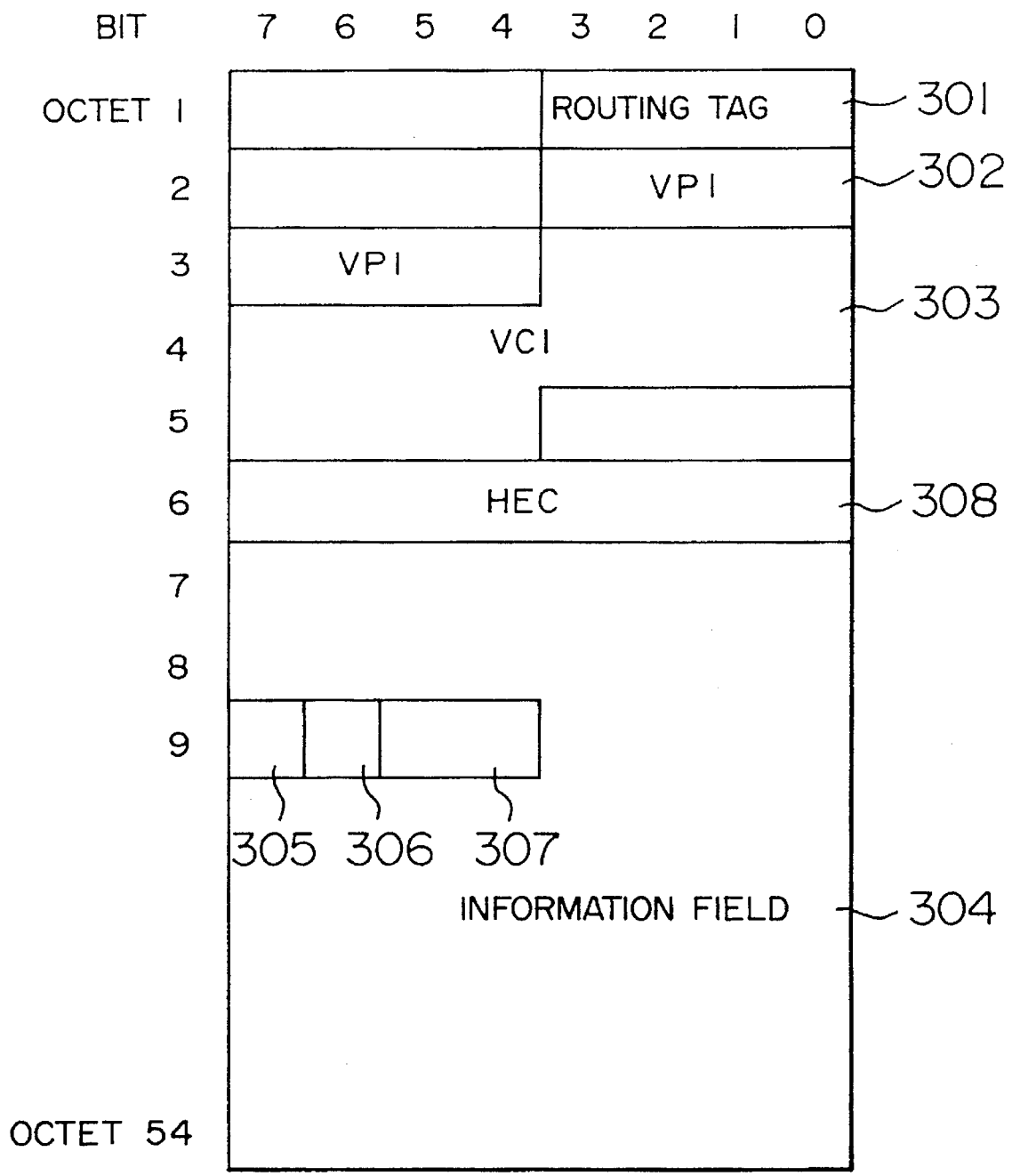
FIG. 3 is a diagram for explaining an exemplary cell format used for communication within the ATM switching system.

FIG. 1 is a block diagram of an arrangement of an ATM switching system in accordance with a first embodiment of the present invention, FIG. 2 is a diagram for explaining a communication sequence used therein, and FIG. 3 is a diagram for explaining an exemplary cell format used therefor. In FIG. 1, reference numeral 101 denotes a central processing unit (which will be referred to as the CPU, hereinafter), numeral 102 denotes a switch unit (which will be referred to as the SW, hereinafter), 103 a line interface unit (which will be referred to as the LIF, hereinafter), 104 a terminal processor (which will be referred to as the TC, hereinafter), 111 a main processor (which will be referred to as the MP, hereinafter), 112 a reset cell generator, 115 an assembler, 121 a dropper, 131 a reassembler, 133 a reset cell monitor, and 402 a public communication network.

More specifically, in the ATM switching system, the CPU 101 performs management of the ATM switching system and call control, the SW 102 performs cell switching operation in ATM layers, and the LIF 103 forms an interface with lines. More specifically, a cell is input to the ATM switching system via the LIF 103 from a terminal connected to the ATM switching system or from the public communication network. The cell has routing information therein. In the present embodiment, the LIF 103 processes the routing information of the cell into a form easily usable in the ATM switching system and attaches the processed information to its head as a routing tag.

In conjunction with this sample processing, inter-processor communication within the ATM switching system will be explained. The routing tag given by the LIF 103 is determined by the CPU 101 so as to set a speech path determined by the calling operation with the terminal or opposing station.

The MP 111 within the CPU 101 transmits the routing tag from the MP 111 to the TC 104 of the LIF 103 with use of layer 1 through mutual communication with the TC 104. The layer 1 is divided into an ATM adaptation layer (which will be referred to as AAL layer, hereinafter), an ATM layer, and a physical (PHY) layer, as illustrated by a table showing a relationship between OSI (Open Systems Interconnection) model and B-ISDN protocol.

The AAL layer functions to segment a layer 2 frame into cell segments and to reassemble the cell segments into the layer 2 frame, the ATM layer functions to perform routing operation, and the PHY layer functions to transmit information in bit form.

Thus, the information issued by the MP 111 is stored in cells, subjected to processing of the AAL, ATM and PHY layers within the CPU 101, and then sent to the SW 102. The SW 102 has a function of performing cell switching operation on the basis of the routing information within the cell (self routing). That is, the SW 102 performs its routing operation in the ATM layer and transmits the cell to the LIF 103. At this time, the SW 102 determines its cell transmission route on the basis of the routing tag attached to the cell head.

The LIF 103 detects a bit train in the PHY layer, identifies the cell in the ATM layer, and generates the layer 2 frame from the cell in the AAL layer. The processing of layers higher than the layer 2 is carried out by the TC 104.

In this way, the communication cells run between the MP 111 (a processor) and the TC (another processor) 104 of the LIF 103 in the ATM switching system.

FIG. 2 shows a communication sequence between the MP 111 and TC 104 as mentioned above. More specifically, the TC 104, when receiving information (I) 201 from MP 111, sends to the MP 111 a response (R) 202 indicative of acceptance of the information 201. MP 111 recognizes the normal operation of the TC 104 when receiving the response 202.

In such a sequence, even when a predetermined constant time (T) 203 elapses after the transmission of the information 201 from MP 111, MP 111 fails to receive the response 202 to information 201. In this case, MP 111 recognizes that a trouble occurs in TC 104 and sends a reset cell to the TC 104 to reset the TC 104.

The cell format within the ATM switching system comprises a total of 54 octets, i.e., 6 octets of header carrying information for transmission of the cell to a target location and 48 octets of information field 304 carrying information to be transmitted on an end-to-end basis and information of the adaptation layer, as shown in FIG. 3. The sixth octet of the header has an error detection signal HEC (Header Error Control) 308 for protection from error. The second to 54th octets of the cell correspond to a standard cell format determined by the CCITT.

Thus, the cell having the illustrated format is made up of such a standard cell and the first octet header attached thereto. The cell has identification data for distinguishing between use of the cell as the communication cell and use of the cell as the reset cell. Such identification data is assigned the seventh and sixth bits 305 and 306, respectively, in the ninth octet of the information field 304. When the seventh bit 305 is "1" and the sixth bit 306 is "1", this indicates that the cell is a communication cell; whereas, when the seventh bit 305 is "1" and the sixth bit 306 is "0", this indicates that the cell in question is a reset cell. The fourth and fifth bits of the ninth octed of the information field 304 are used to represent a modulo number of 2 bits indicative of the cell order.

These identification data and the modulo number of the communication cell and the reset cell may be assigned anywhere except on the items decided by CCITT in the cell.

In FIG. 1, when it is desired for the MP 111 to reset the TC 104, the first octet as mentioned above is attached to a reset cell to be sent from the MP 111 to the TC 104 in the LIF 103, and then the routing tag 301 is set in the first octet. The set routing tag 301 is the same value as the communication cell between the MP 111 and TC 104.

As explained above, when the cell is input to the ATM switching system, the LIF 103 attaches the routing tag 301 to the cell as a value associated with a virtual path identifier (which will be referred to as the VPI, hereinafter) and a virtual channel identifier (which will be referred to as the VCI, hereinafter), while, when the tag-attached cell is to be output from the ATM switching system, the LIF 103 removes the routing tag from the cell.

Explanation will next be made as to the operation of the ATM switching system for resetting the TC 104 using FIG. 1.

When it is desired for the MP 111 to reset the TC 104, the MP 111 sends a reset indication signal 113 to the reset cell generator 112. The reset cell generator 112, when receiving the reset indication signal 113, generates a reset cell and sends the generated cell to the cell selector 114. The selector 114 performs the contention control between a communication cell received from the assembler 115 and the reset cell and transmits the reset cell to the SW 102. The SW 102 transmits the reset cell to the corresponding LIF 103 according to the routing tag 301 of the reset cell. In this case, the same value as the communication cell between the MP 111 and TC 104 is used for the routing tag 301 of the reset cell.

The LIF 103 is monitoring a cell sent from the SW 102 at the dropper 121, so that, when the seventh bit 305 in the ninth octet of the received cell is "1", the LIF 103 catches the cell. And the reassembler 131 confirms that the sixth bit 306 of the ninth octet of the caught cell is "1", i.e., that the cell is a communication cell. After that, the reassembler 131 reassembles the cell into a layer 2 format and sends it to the TC 104.

When the sixth bit 306 of the ninth octet in the cell is "0", the reset cell monitor 133 thereby confirms that the cell is a reset cell and catches it. When the reset cell monitor 133 catches such reset cell a predetermined number of times, the reset cell monitor 133 outputs a reset signal 141 to the TC 104.

When the number of reset cell reception times is set to be more than 1, the reset cell monitor 133 can confirm the modulo number with respect to the value of the fourth and fifth bits 307 in the ninth octet, catch the pulrality of reset cells according to this sequence number, and output the reset signal 141 to the TC 104 to thereby cope with such an error as a bit error in the reset cells.

The reset signal 141 is a Transistor Transistor Logic (TTL) signal, which is applied to a reset terminal of the TC 104, whereby the TC 104 is reliably reset.

Explanation will then be made as to a modification of the foregoing embodiment of the present invention. There is shown a block diagram of the LIF 103 according to the modification in FIG. 4, in which reference numeral 401 denotes a header error control (HEC) unit and parts having the same reference numerals as those in FIG. 1 denote the same parts.

As illustrated in FIG. 3, a cell within the ATM switching system comprises a total of 54 octets, i.e., 6 octets of headers (302, 303) carrying information for transmission of the cell and 48 octets of information field 304 carrying information to be transmitted on an end-to-end basis and information of the adaptation layer. The header has an error detection signal HEC for protection from transmission error.

The present modification is designed so that an error is purposely provided to the HEC 308 of the reset and communication cells and the cells are detected to be an error through header check. That is, the present embodiment is substantially the same as the foregoing embodiment, except that the dropper 121 in the LIF 103 of the foregoing embodiment of FIG. 1 is omitted and the header error control 401 is newly provided.

In the present modification, as already explained in conjunction with the foregoing embodiment of FIG. 1, the reassembler 131, when the seventh bit 305 in the ninth octed of the cell is "1" and the sixth bit 306 is "1", the reassembler 131 confirms that the cell is a communication cell and catches the cell. When the seventh bit 305 of the ninth octet in the cell is "1" and the sixth bit 306 is "0", the reset cell monitor 133 confirms that the cell is a reset cell and catches it.

The header error check control 401 functions to detect a header error in the communication and reset cells on the basis of the header error detection signal HEC. When detecting a header error, the header check control 401 discards the cell so as not to send it to the public communication network 402.

Figure 4:
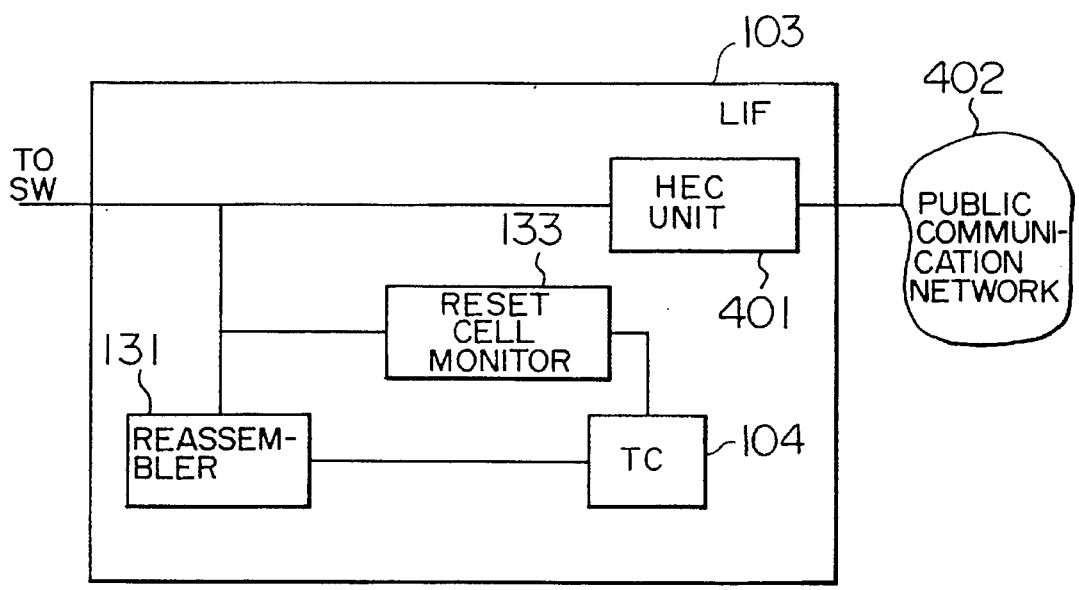
FIG. 4 is a block diagram of a Line Interface Unit in accordance with a modification of the embodiment of the present invention.

That is, the dropper judges whether the cell is a user cell to be transmitted to the public communication network 402 or a communication/reset cell to be handled within the LIF 103 and classifies it based on the judgement in the embodiment of FIG. 1; whereas, in the embodiment of FIG. 4, such judgement and classification is not carried out and instead the same object is attained by catching all cells and discarding cells not directed to itself at the processing parts (131, 133) and at the exit (401) to the public communication network.

Figure 5:
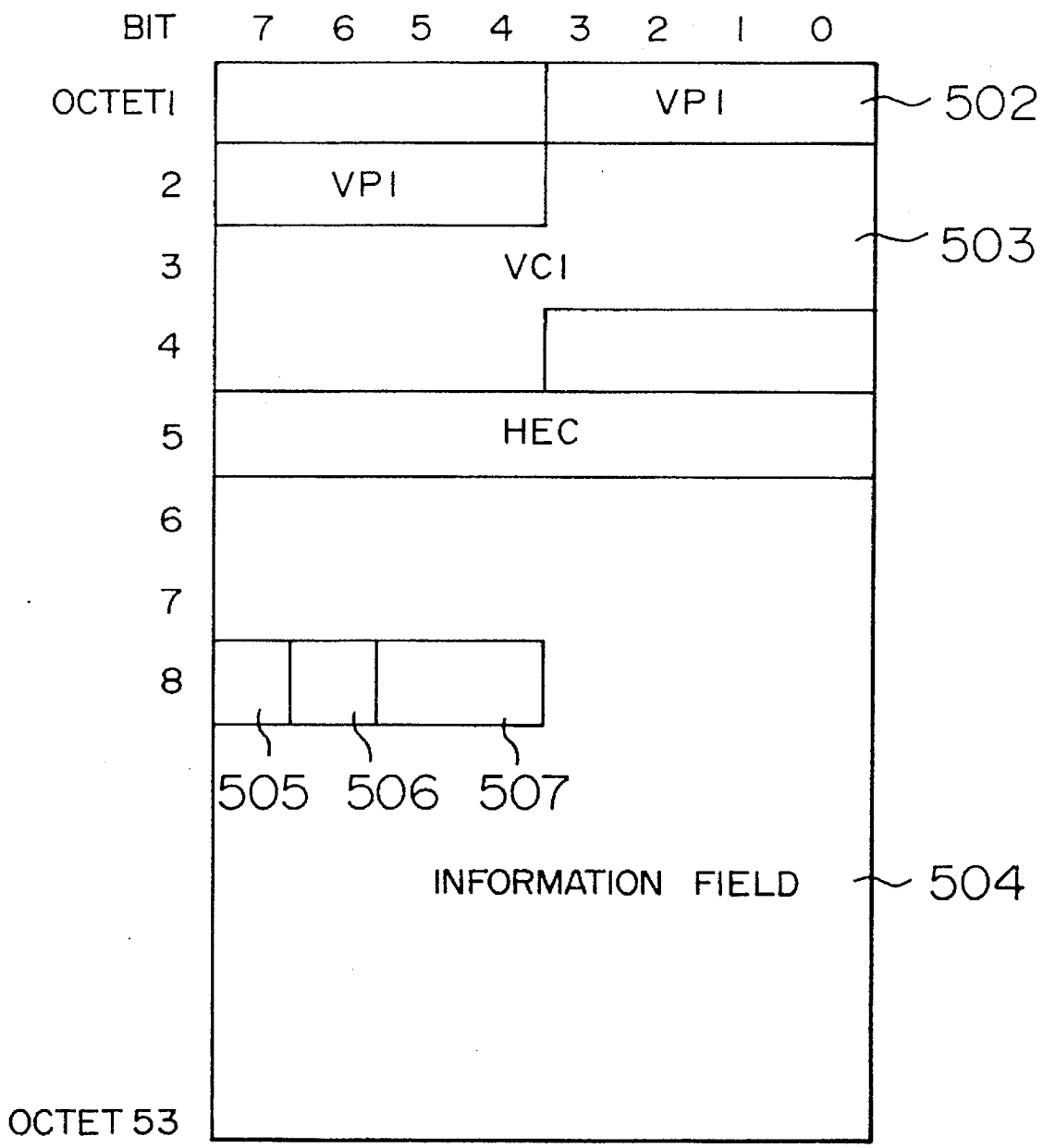
FIG. 5 is a diagram for explaining an exemplary cell format used for communication between the switching systems and between the switching system and terminal.

Another embodiment of the present invention is suitable when one processor of one ATM node is connected to another processor of another ATM node through the public communication network 402 and it is desired for one processor to reset the other processor. Hereinafter, assume that the ATM nodes are ATM switching systems. FIG. 5 shows a format of cells transmitted between the ATM switching systems and between the ATM switching system and a terminal. A difference in the format between the cells of FIGS. 3 and 5 is the presence and absence of the routing tag 301 in the heads of the cells.

Figure 6:
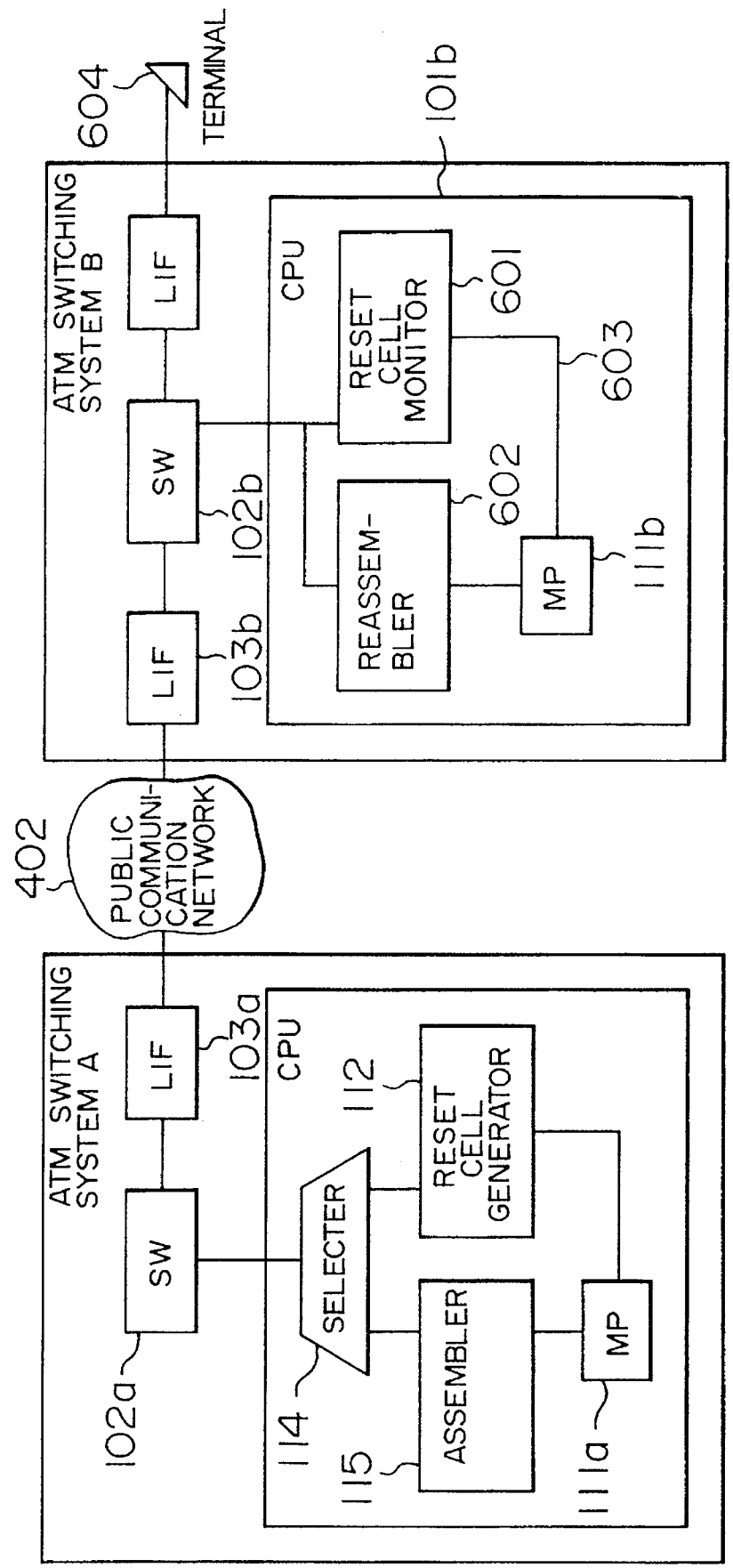
FIG. 6 is a block diagram of an arrangement of another embodiment of the present invention.

FIG. 6 shows a block diagram of the present embodiment, in which reference numeral 601 denotes a reset cell monitor and numeral 602 denotes a reassembler, and parts having the same reference numerals as those in FIG. 1 are unchanged. However, the same parts in the two ATM switching systems A and B are distinguished by applying suffix 'a' and 'b' to the corresponding parts.

The operation of the embodiment of FIG. 6 will be explained in connection with the case where it is desired for MP 111a to reset MP 111b.

When it is desired for the MP 111a to reset the MP 111b, the MP 111a sends the reset indication signal 113 to the reset cell generator 112. When receiving the reset indication signal 113, the reset cell generator 112 generates a reset cell having the within-ATM-system format as already explained in FIG. 3 and sends the cell to the selector 114. The selector 114 performs its contention control with the communication cell received from the assembler 115 and sends the reset cell to a SW 102a.

Attached to this reset cell are the routing tag 301, VPI 302 and VCI 303 to cause the cell to arrive at the opposing the MP 111b. The same values as in communication cell are provided to the routing tag 301, VPI 302 and VCI 303. The routing tag 301 is removed from the cell at an LIF 103a and the cell is transferred between the two ATM switching systems with such a cell format as shown in FIG. 5. After that, a routing tag which relates to the VPI 302 and VCI 303 is applied again at the LIF 103b of the ATM switching system B. The value of this routing tag is previously set so that the SW 102b can transmit the cell to a CPU 101b.

The cell transmitted into the CPU 101b is caught at the MP 111b. This is carried out as follows. When receiving the cell from the SW 102b, the reassembler 602 checks if the seventh bit 304 in the ninth octet of the cell is "1" and the sixth bit 305 is "1", which means the cell is a communication cell. If so, the reassembler 602 catches the cell. While, when receiving the cell from the SW 102b, the reset cell monitor 601 checks if the seventh bit 304 in the ninth octet of the cell is "1" and the sixth bit 305 is "0", which means the cell is a reset cell. If so, the reset cell monitor 601 catches the cell. The reset cell monitor 601, when receiving such reset cells by a predetermined number of times, outputs a reset signal 603 to the MP 111b.

When the number of reset cell reception times is set to be more than 1 as mentioned above, the reset cell monitor 601 can confirm the modulo of a sequence number at the fourth and fifth bits 307 in the ninth octet, accept the plurality of reset cells according to this sequence number, and output the reset signal 603 to thereby avoid erroneous recognition of the cell as a reset cell. The reset signal 603, which is a TTL signal, is applied to a reset terminal of the MP 111b, whereby the MP 111b is reliably reset. Even when it is desired for a terminal 604 to reset the MP 111b, this can be carried out in substantially the same manner as set forth above.

Although the seventh and sixth bits 304 and 305 in the ninth octet of the information field 304 have been used to indicate the type of cell in the foregoing cell format within the ATM switching system, the present invention is not limited to the specific example and as another method of indicating the cell type, the information field 304 may be removed and, instead, bits for representing of the cell type may be provided to the head of the cell.

Figure 7:
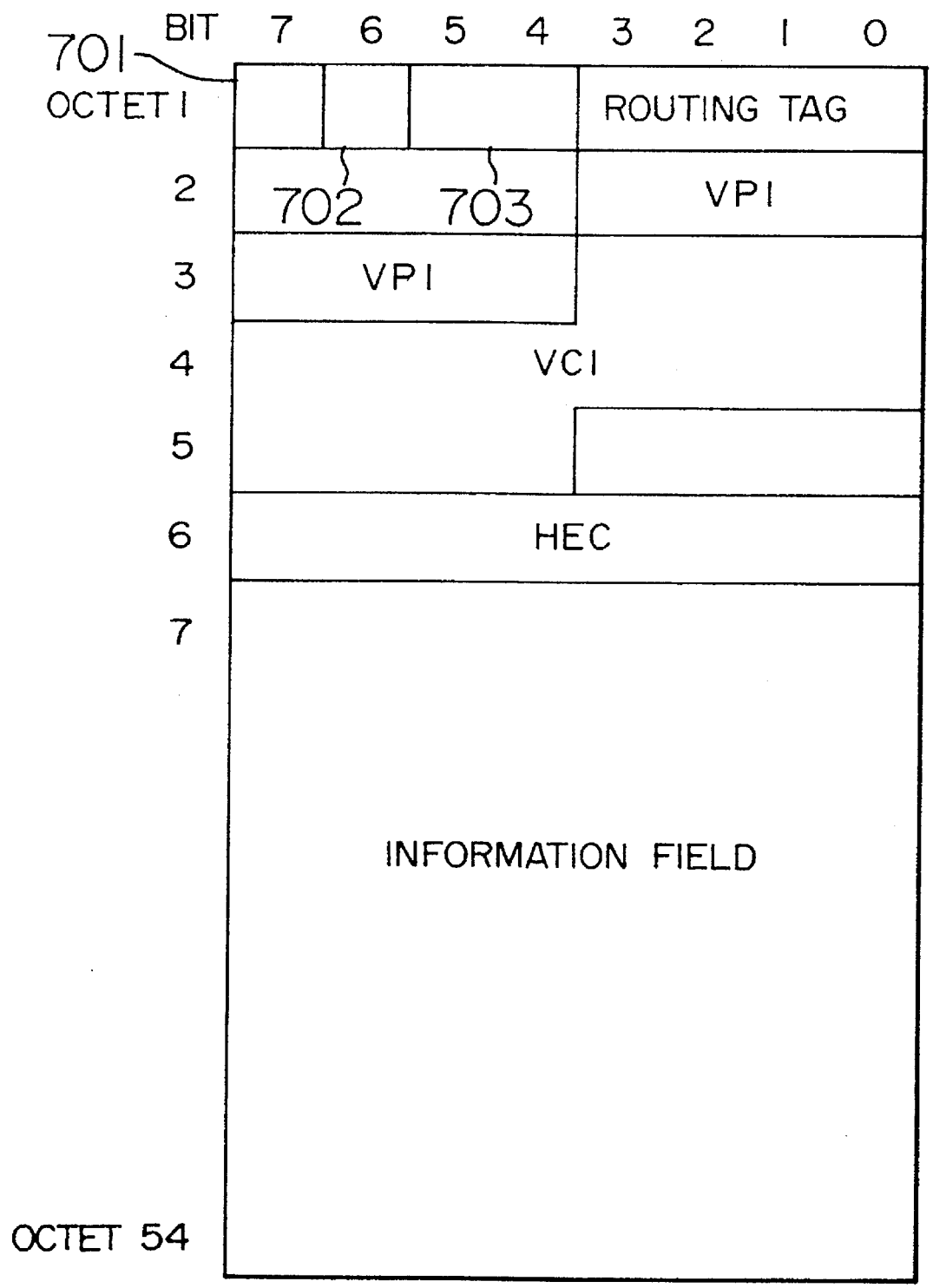
FIG. 7 is a diagram for explaining an exemplary cell format having a cell-type identification bit attached to its cell head.
Figure 8:
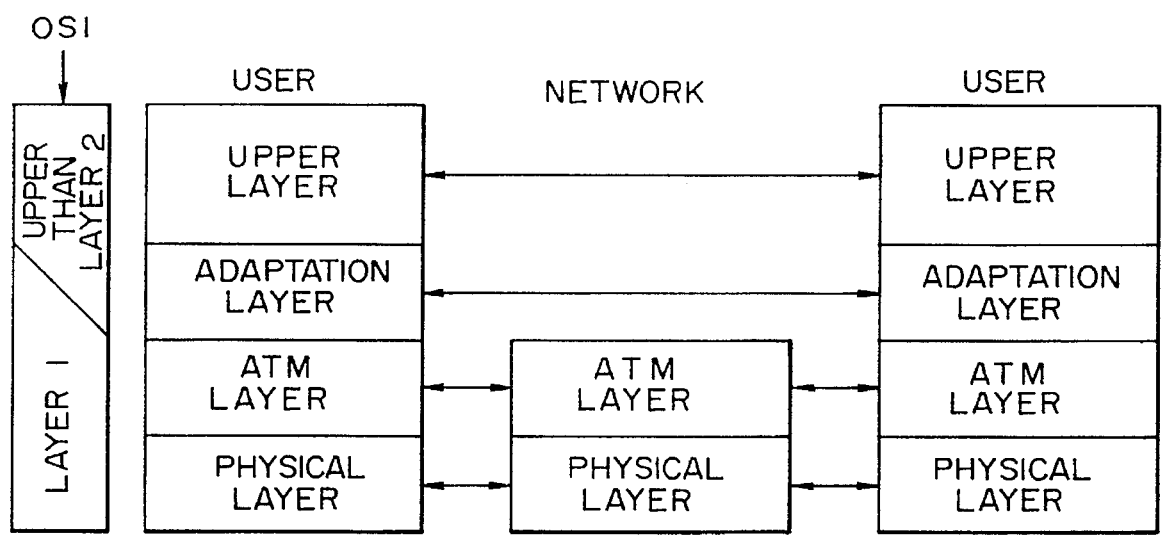
FIG. 8 a protocol hierarchical diagram for a B-ISDN.

An example of the structure of the cell used in the latter case is shown in FIG. 7. In the illustrated cell, the type of the cell is represented by seventh and sixth bits 701 and 702 in the first octet, so that, when the seventh bit 701 is "1" and the sixth bit 702 is "0", the cell indicates a reset cell, whereas, when the seventh bit 701 is "1" and the sixth bit 702 is "1", the cell indicates a communication cell. A modulo number is provided to fourth and fifth bits 703 in the first octet.

When a cell having such a format as shown in FIG. 7 is employed, substantially the same operation as in the foregoing embodiments is effected except that bits to be referred to in the reset cell monitor and the reassembler are changed.

As has been explained in the foregoing, in accordance with the present embodiments, in interprocessor communication based on channel, one processor can positively reset the party processor regardless of the state of the party processor.

What is claimed is:

1. In a system in which communication between processors within an Asynchronous Transfer Mode (ATM) node or between processors belonging to different ATM nodes is carried out through channels using cells, a processor resetting method comprising the steps of:

generating, at a sender node, a reset cell having a predetermined pattern corresponding to one of said processors located at a receiver node, when said sender node detects a failure of said one processor at said receiver node;

transmitting said reset cell to said receiver node through one of the channels;

detecting, at means provided externally of said one processor, said reset cell sent through the one channel to the receiver node; and resetting, at said means external to said one processor, said one processor in accordance with said reset cell.

2. A processor resetting method as set forth in claim 1, wherein said reset cell is a cell having a header check error.

3. A processor resetting method as set forth in claim 1, wherein said reset cell has said predetermined pattern attached to a head of said cell.

4. A processor resetting method as set forth in claim 1, wherein, when said receiver node detects a plurality of reset cells, the processor in said receiver node is reset.

5. A processor resetting method as set forth in claim 2, wherein, when said receiver node detects a plurality of reset cells, the processor in said receiver node is reset.

6. A processor resetting method as set forth in claim 3, wherein, when said receiver node detects a plurality of reset cells, the processor in said receiver node is reset.

7. A processor resetting method as set forth in claim 4, wherein said reset cell has a sequence number and, when said receiver node detects the plurality of reset cells according to the sequence number, the processor in said receiver node is reset.

8. A processor resetting method as set forth in claim 5, wherein said reset cell has a sequence number and, when said receiver node detects the plurality of reset cells according to the sequence number, the processor in said receiver node is reset.

9. A processor resetting method as set forth in claim 6, wherein said reset cell has a sequence number and, when said receiver node detects the plurality of reset cells according to the sequence number, the processor in said receiver node is reset.

10. An ATM node having one or more processors, said ATM node comprising:

means for receiving communication cells and reset cells;

means, provided for each of said processors and further provided externally of said processors, for distinguishing a reset cell having a predetermined pattern therein from other received cells; and means for resetting a processor, at a corresponding one of said means external to said processors, in response to said reset cell having said predetermined pattern when failure of the processor has been detected.

11. An ATM node as set forth in claim 10, further comprising means for generating and transmitting said reset cell to either of another processor within the same ATM node or another ATM node.

12. An ATM node as set forth in claim 10, wherein said resetting means outputs a reset signal to said corresponding processor to reset said corresponding processor.

13. A communication system including one or more nodes, wherein each of said nodes comprises:

one or more processors;

means for generating a reset cell having a predetermined pattern and transmitting the reset cell to a corresponding processor when detecting a failure of said processor; and means, provided for each of said one or more processors and further provided externally of said processors, for detecting said reset cell and resetting the corresponding processor in accordance with said reset cell.

* * * * *